United States Patent [19]
Matsuo et al.

[11] Patent Number: 4,774,919
[45] Date of Patent: Oct. 4, 1988

[54] COMBUSTION CHAMBER IMPORTING SYSTEM FOR TWO-CYCLE DIESEL ENGINE

[75] Inventors: Noritaka Matsuo; Tatsuyuki Masuda; Minoru Suzuki, all of Iwata, Japan

[73] Assignee: Yamaha Hatsudoki Kabushiki Kaisha, Iwata, Japan

[21] Appl. No.: 92,161

[22] Filed: Sep. 2, 1987

[30] Foreign Application Priority Data

Sep. 8, 1986 [JP] Japan .................. 61-209654
Sep. 22, 1986 [JP] Japan .................. 61-222081

[51] Int. Cl.4 ............................................. F03B 19/18
[52] U.S. Cl. ..................................... 123/257; 123/286
[58] Field of Search ............. 123/257, 275, 286, 65 P, 123/73 C, 73 PP

[56] References Cited

U.S. PATENT DOCUMENTS

| | | | |
|---|---|---|---|
| 1,941,805 | 1/1934 | Lang ................... | 123/256 |
| 1,944,352 | 1/1934 | Lang ................... | 123/26 |
| 2,004,631 | 6/1935 | Lang ................... | 123/256 |
| 2,696,808 | 12/1954 | Chronic et al. ........ | 123/263 |
| 2,747,556 | 5/1956 | Schreiber .............. | 123/257 |
| 3,044,455 | 7/1962 | Papa et al. ............ | 123/257 |
| 3,934,562 | 1/1976 | Isaka .................. | 123/257 X |
| 4,006,720 | 2/1977 | Sato et al. ............ | 123/286 X |
| 4,124,000 | 11/1978 | Genslak ................ | 123/256 |
| 4,237,827 | 12/1980 | Hamai .................. | 123/262 |

FOREIGN PATENT DOCUMENTS

0579556 6/1933 Fed. Rep. of Germany .
0366114 12/1938 Italy .

OTHER PUBLICATIONS

SAE Technical Paper Series—"Investigation of a Spark-Assisted Diesel Engine", R. G. Phatak, Southwest Research Institute and K. Komiyama, Komiyama, Komatsu Ltd., Japan.

The Internal Combustion Engine in Theory and Practice, C. F. Taylor, vol. 3, p. 112, MIT Press, 1968, p. 5 of 6.

Internal Combustion Engines, R. S. Benson and N. D. Whitehouse, vol. 1, p. 8, Pergamon Press 1979.

Primary Examiner—Willis R. Wolfe
Attorney, Agent, or Firm—Ernest A. Beutler

[57] ABSTRACT

A combustion chamber configuration and porting arrangement for a two-cycle crankcase compression diesel engine that improves scavenging. An exhaust port opens into one side of the engine cylinder bore and the scavenge ports and a precombustion chamber are configured so that they discharge their gases in an area diametrically opposed to the exhaust port for improving scavenging.

5 Claims, 2 Drawing Sheets

COMBUSTION CHAMBER IMPORTING SYSTEM FOR TWO-CYCLE DIESEL ENGINE

BACKGROUND OF THE INVENTION

This invention relates to an improved combustion chamber system for a two-cycle diesel engine and more particularly to an improved porting and combustion system for such an engine that will improve scavenging.

The advantages of two-cycle engines are well know. Because of their simple construction and high output, they lend themselves to application for a wide variety of purposes. However, the simplified porting arrangement and two-cycle operation gives rise to certain problems in connection with these engines. Specifically, since the intake charge is delivered to the combustion chamber at the same that the exhaust is being discharged, good scavenging is extremely important. The porting configuration and associated cooperation with the combustion chamber should be such that all of the burnt combustion products from the previous cycle are purged from the combustion chamber and also that none of the fresh charge passes out of the exhaust port this operation. This is an extremely difficult problem. When the engine is operated on the diesel principle, these problems become even more acute due to the form of combustion which occurs in the diesel cycle.

It is, therefore, a principle object of this invention to provide an improved combustion chamber and porting configuration for a two-cycle engine.

It is a further object of this invention to provide an improved porting arrangement and combustion chamber for a two-cycle diesel engine wherein good scavenging is assured.

SUMMARY OF THE INVENTION

This invention is adapted to be embodied in a two-cycle crankcase compression internal combustion engine that is comprised of a cylinder having a cylinder bore, a piston reciprocating in the cylinder bore and a cylinder head that is affixed to the cylinder. Exhaust port means open into the cylinder bore in one side thereof and scavenge port means open into the cyliner bore and are configured to direct the flow of charge from the crankcase toward the portion of the cylinder bore diametrically opposed to the exhaust means port and directed upwardly toward the cylinder head. A chamber is formed in the cylinder head and communicates with the cylinder bore through a restricted throat. The throat is directed toward the diametrically opposed portion of the cylinder bore and means are incorporated for initiating combustion in the cylinder head chamber.

DETAILED DESCRIPTION OF THE PREFERRED EMBODIMENT OF THE INVENTION

Figure 1:
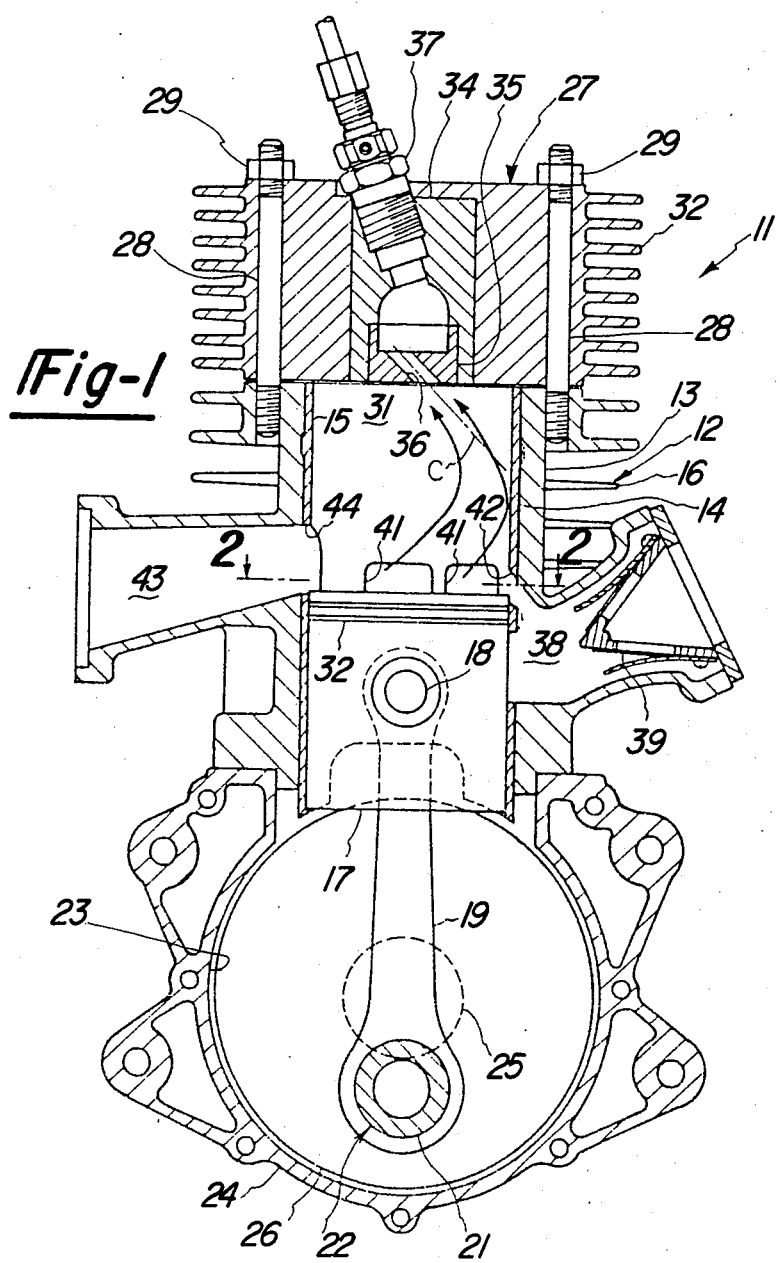
FIG. 1 is a vertical cross-sectional view taken through a single cylinder of an internal combustion engine constructed in accordance with an embodiment of the invention.

In the drawings, the reference numeral 11 indicates generally a two-cycle crankcase compression diesel engine constructed in accordance with an embodiment of the invention. The engine 11 is depicted as being of the single-cylinder type. It should be readily apparent to those skilled in the art, however, that the invention may be applied to engines having other cylinder numbers and various cylinder configurations such as in-line engines, V-type engines and opposed engines.

The engine 11 is comprised of a cylinder block, indicated generally by the reference numeral 12 that defines a cylinder 13 in which a liner 14 is received and which forms a cylinder bore 15. In the illustrated embodiment, the engine 11 is of the air-cooled type and to this end, the cylinder 13 is provided with a plurality of cooling fins 16.

A piston 17 is supported for reciprocation within the cylinder bore 15 and is connected by means of a piston pin 18 to the upper end of a connecting rod 19. The lower end of the connecting rod 19 is journaled on a throw 21 of a crankshaft 22. The crankshaft 22 is rotatably journaled within a crankcase chamber 23 that is formed by the cylinder block 12 and a crankcase 24 that is affixed in any known manner to the cylinder block 12. The crankshaft 22 has main bearing portions 25 that are suitably journaled within the crankcase by bearings supported between the crankcase 24 and cylinder block 12 in a known manner. In addition, a fly wheel portion 26 is formed on the crankshaft 22 for a known purpose.

The upper end of the cylinder bore 15 is closed by means of a cylinder head, indicated generally by the reference numeral 27 that is affixed to the cylinder block 12 in a known manner as by means of studs 28 and nuts 29. The cylinder head 27 cooperates with the cylinder block and specifically the cylinder bore 15 and the area above the head of the piston 17 to form a main combustion chamber, indicated generally by the reference numeral 31. It should be noted that the piston 17 contains piston rings 32 that sealingly engage the cylinder liner 14 so as to seal the combustion chamber 31. The cylinder head 27 is also formed with cooling fins 32 for the air cooling thereof.

A precombustion or torch chamber 33 is formed within the cylinder head 27 by means of cooperating first and second inserts 34 and 35 that are fixed in a suitable manner in the cylinder head 27. The chamber 33 has a relatively small volume and communicates with the main combustion chamber 31 through a throat portion 36 that is oriented in a manner to be described so as to asist in the scavenging of the combustion chamber 31 at the end of the combustion cycle.

A fuel injection nozzle 37 is affixed to the cylinder head 27 and discharges into the precombustion chamber 33. Fuel is supplied to the fuel injection nozzle 37 in a suitable manner.

A fresh air charge is delivered to the crankcase chamber 23 during the upward movement of the piston 17 from an air inlet device (not shown) through an intake port 38 that is formed in the cylinder block 12. A reed-type valve 39 is positioned at the inlet to the intake port 38 so as to prevent any reverse flow. The downstream end of the intake port 38 communicates with the crankcase chamber 23 as the piston 17 approaches its top dead center position.

Figure 2:
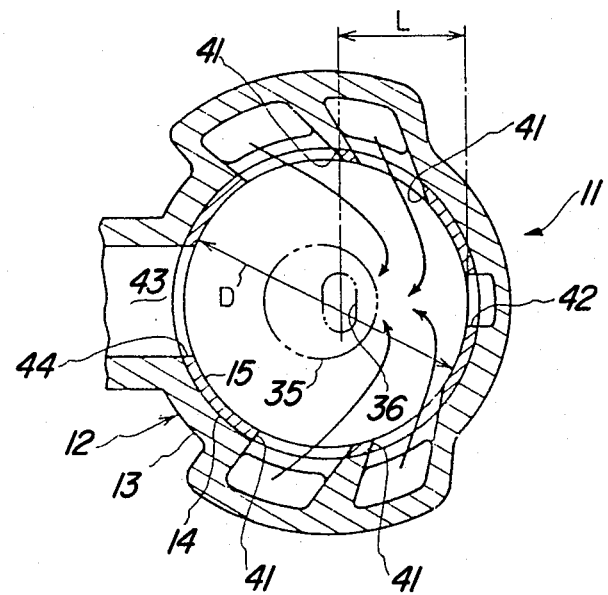
FIG. 2 is a cross-sectional view taken along a line 2—2 of FIG. 1.

A plurality of main scavenge passages extend from the crankcase chamber 23 through the cylinder block 12 and cylinder liner 14 and discharge into the combustion chamber 31 when the piston 17 approaches its bottom dead center position. The main scavenge ports 41 are configured so as to direct the intake charge in the direction indicated by the arrows in FIGS. 1 and 2 toward one side of the cylinder bore 15 and in an upward fashion. As a result, the intake charge is deflected by the cylinder bore 14 in an upward direction toward the lower surface of the cylinder head 27 and in proximity to the discharge end of the throat 36.

An auxiliary or boost intake port 42 extends directly from the main intake port 38 into the combustion chamber 31 and is also configured so as to assist the direction of flow of the intake charge as aforedescribed.

An exhaust passage 43 opens through the side of the cylinder bore 15 diametrically opposed to the area of the cylinder bore 15 where the fresh air scavenge charge impinges. The exhaust passage 43 terminates in an exhaust port 44 that is formed in the cylinder liner 14 on this diametrically opposed side.

When the piston 17 begins its downward stroke and after the scavenge ports 41 and boost port 42 are opened, the intake charge will flow into the combustion chamber 31 in the direction of the arrows. As the pistons 17 begins its upward stroke and at the appropriate time, the injection nozzle 37 will discharge and ignition will begin in the precombustion or chamber 33. As the gases burn and expand in the chamber 33, they will be discharged through the throat 36 in the direction of the line C in FIG. 1 toward the area of the cylinder bore 15 that is impinged upon by the fresh air charge. This will cause the gases to be turned and directed toward the exhaust port 44 and exhaust passage 43 so as to substantially improve scavenging. It should be noted that the throat 36 is offset at a distance L from the cylinder bore diameter D to one side of the cylinder bore axis so as to assist in this flow direction. Because of this arrangement, the gases will be directed in such a way that there will be a minimum discharge of fresh air charge out of the exhaust port 44 and exhaust passage 43 during engine operation and hence, extremely good efficiency will result.

It is to be understood that the foregoing description is that of a preferred embodiment of the invention and that various changes and modifications may be made without departing from the spirit and scope of the invention, as defined by the appended claims.

We claim:

1. In a two-cycle crankcase compression internal combustion engine comprised of a cylinder having a cylinder bore, a piston reciprocating in said cylinder bore, a cylinder head affixed to said cylinder, exhaust port means opening into said cylinder bore at one side thereof, scavenge port means opening into said cylinder bore at a point spaced from said exhaust port means and configured to direct the flow of a charge from said crankcase toward the portion of said cylinder bore diametrically opposed to said exhaust port means and directed upwardly towards said cylinder head, a chamber formed within said cylinder head and communicating with said cylinder bore through a restricted throat, said throat being offset from said diametrically opposed portion of said cylinder bore and directed at an angle toward said diametrically opposed portion of said cylinder bore, said throat being disposed so as to direct the flow of expanding gases from said cylinder head chamber toward said diameterically opposed portion of said cylinder bore for redirecting the flow toward said exhaust port means, and means for initiating combustion in said cylinder head chamber.

2. In a two-cycle crankcase compression internal combustion engine as set forth in claim 1, wherein the scavenge port means and throat are directed so that their flow impinge upon the same area of the cylinder bore.

3. In a two-cycle crankcase compression internal combustion engine as set forth in claim 1, wherein the means for initiating combustion in the cylinder head chamber comprises a fuel injection nozzle for causing self-ignition for operating on a diesel cycle.

4. In a two-cycle crankcase compression internal combustion engine as set forth in claim 3 wherein the fuel injection nozzle discharges directly into the cylinder head chamber.

5. In a two-cycle crankcase compression internal combustion engine as set forth in claim 4, wherein the scavenge port means and throat are directed so that their flow impinge upon the same area of the cylinder bore.

* * * * *